(12) United States Patent
Liu et al.

(10) Patent No.: US 6,829,660 B2
(45) Date of Patent: Dec. 7, 2004

(54) SUPERCHARGE MESSAGE EXCHANGER

(75) Inventors: Michael Liu, Alhambra, CA (US); Bradley Roach, Newport Beach, CA (US); Sam Su, Irvine, CA (US); Peter Fiacco, Yorba Linda, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 0 days.

(21) Appl. No.: 10/316,604

(22) Filed: Dec. 10, 2002

(65) Prior Publication Data

US 2003/0126320 A1 Jul. 3, 2003

Related U.S. Application Data

(60) Provisional application No. 60/340,386, filed on Dec. 12, 2001.

(51) Int. Cl.[7] ............................................... G06F 13/28
(52) U.S. Cl. ........................... 710/22; 710/38; 710/305; 709/212
(58) Field of Search ..................... 710/22, 23, 36–38, 710/305, 306, 308, 316; 709/212, 225; 700/1, 2, 4, 11, 21

(56) References Cited

U.S. PATENT DOCUMENTS

| | | | |
|---|---|---|---|
| 5,561,770 A | 10/1996 | Bruijn et al. | |
| 5,828,856 A | 10/1998 | Bowes et al. | |
| 5,875,343 A | 2/1999 | Binford et al. | |
| 5,961,614 A | 10/1999 | Christiansen | |
| 6,061,748 A | 5/2000 | Taglione et al. | |
| 6,253,250 B1 | 6/2001 | Evans et al. | |
| 6,434,630 B1 * | 8/2002 | Micalizzi et al. | 710/5 |

* cited by examiner

Primary Examiner—Kim Huynh
(74) Attorney, Agent, or Firm—Morrison & Foerster LLP (57) ABSTRACT

A system with a first random access memory (RAM), a second RAM, a first processor coupled to the first RAM and a second processor coupled to the second RAM. The first RAM is configured to store input/output (I/O) completions from at least two engines. The second RAM is also configured to store I/O completions from at least two engines. When all engines are active, the system writes I/O completions from the engines to the first and second RAMs. The first processor processes I/O completions stored in the first RAM. The second processor processes I/O completions stored in the second RAM.

40 Claims, 7 Drawing Sheets

SUPERCHARGE MESSAGE EXCHANGER

CLAIM OF PRIORITY

The present application claims priority to U.S. Patent application Ser. No. 60/340,386, entitled "Supercharge Message Exchanger," filed on Dec. 12, 2001, which is incorporated herein by reference in its entirety.

BACKGROUND

A data processing system may receive data from a plurality of sources.

SUMMARY

The application relates to a system for receiving and processing data from a plurality of sources. A message exchange system is provided to allow two or more processors to communicate more efficiently, which may improve input/output (I/O) processing speed.

In an embodiment, the system allows I/O completions to be posted to two memories associated with two processors. Either processor can access an I/O completion notification and prepare the I/O for a subsequent operation.

In an embodiment, the system may use zero-wait-state random access memories (RAMs) to store I/O completion notices from the DMA and messages between processors. The zero-wait-state RAMs reduce RAM access latency. Alternatively, the system may use higher latency RAMs with wait-states to achieve more information capacity at reduced performance.

When a plurality of different sources try to write to a RAM at the same time via a plurality of data paths, the system may overcome the possibility of data corruption by storing data in registers. The system also allows fair and quick access to a plurality of logical partitions in a RAM. Registers also overcome the possibility of data corruption when the RAM is full and a source tries to continue writing to the RAM.

The system may be configured to handle I/O completions that originate from different clock domains. For example, two I/O completions may come from a peripheral component interface (PCI) side, which may be running at 33 MHz, 66 MHz or 133 MHz. Two I/O completions may come from a Fibre Channel Link side, which may be synchronized to 106 MHz or 200 MHz clocks. And an ARM processor may post an I/O completion or inter-processor message with a 200 MHz clock.

The system may keep track of an empty or full status of a RAM and how many locations are filled in the RAM.

In addition, the system may also use door bell registers to notify a processor about important events. The door bell registers allow a first processor to set a particular door bell bit and allow a second processor to read and clear the particular door bell bit. The first processor may also be able to generate an interrupt when a particular door bell bit is set by the second processor.

The system may be implemented in an application specific integrated circuit (ASIC) or a field programmable gate array (FPGA) device.

An aspect of the application relates to a system comprising a first channel and a second channel. The first channel comprises a first direct memory access (DMA) engine, a second DMA engine, a first random access memory (RAM) and a first processor. The second channel comprises a third DMA engine, a fourth DMA engine, a second RAM and a second processor.

Another aspect relates to a channel comprising a random access memory, first and second engines and a processor. The random access memory is configured to store input/output completions. The first and second engines are configured to send input/output completions to the random access memory. The processor is configured to process the input/output completions stored in the random access memory.

Another aspect relates to a method comprising: configuring a random access memory (RAM) of a first channel to store input/output (I/O) completions from an engine in a second channel; and processing I/O completions in the RAM of the first channel.

Another aspect relates to a method comprising: detecting whether an engine of a first channel is inactive; if the engine of the first channel is inactive, storing input/output (I/O) completions from an engine in a second channel to a random access memory of the first channel; and processing the I/O completions in the random access memory of the first channel.

Another aspect relates to a method comprising: receiving input/output (I/O) completions from a plurality of data paths; storing the I/O completions in a plurality of registers, each register being configured to store an I/O completion from a predetermined data path; and transferring the I/O completions from the registers to a plurality of logical blocks of a random access memory, each logical block being configured to store I/O completions from a predetermined data path.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
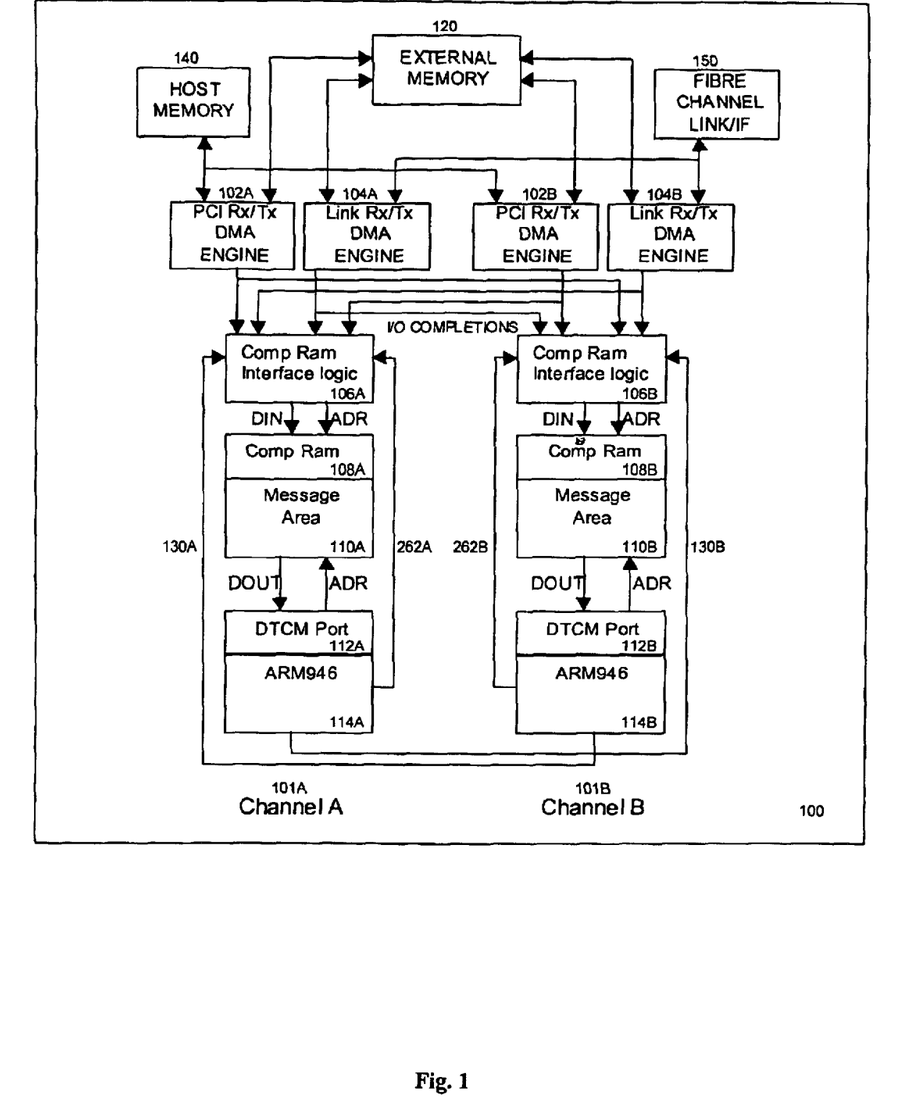
FIG. 1 illustrates an embodiment of a dual channel system that may be configured to act as a supercharge channel system.

FIG. 1 illustrates an embodiment of a dual channel system 100 that may be configured to act as a supercharge channel system. The system 100 includes two peripheral component interface (PCI) receive/transmit (Rx/Tx) direct memory access (DMA) ports or engines 102A, 102B, two Link (e.g., Fibre Channel) Rx/Tx DMA ports or engines 104A, 104B, two completion RAM interface logic units 106A, 106B, two completion RAMs 108A, 108B, message areas 110A, 110B, data tightly coupled memory (DTCM) ports 112A, 112B and processors 114A, 114B. The system 100 may include other elements in addition to or instead of the elements shown in FIG. 1.

Figure 6:
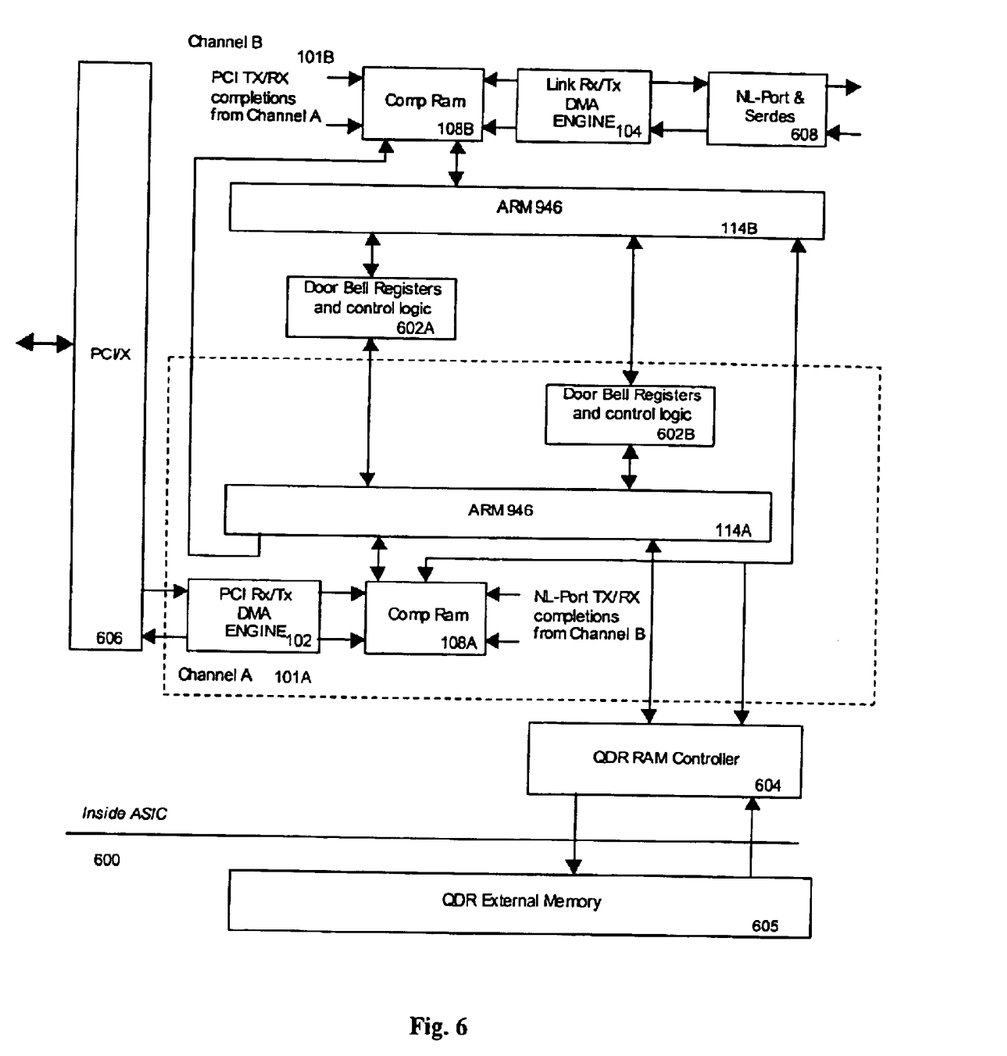
FIG. 6 illustrates an embodiment of dual processors operating in a single channel mode.

The PCI Rx/Tx DMA engines 102A, 102B may transfer data between a host memory 140 (via a PCI bus) and an external, intermediate memory 120 (same as external memory 605 in FIG. 6). The memory 120 may be either on or off the ASIC of the system 100. The Link Rx/Tx DMA engines 104A, 104B may transfer data between the intermediate memory 120 and a Fibre Channel Link/interface 150. The Fibre Channel Link/interface 150 may also be referred to as an N-port and an L-port or an NL-Port.

The system 100 includes a Channel A portion (side) 101A and a Channel B portion (side) 101B. Each "channel" 101 includes a PCI Rx/Tx DMA engine 102, a Link Rx/Tx DMA engine 104, completion RAM interface logic 106, a completion RAM 108 and a processor 114.

PCI and Fibre Channel DMA are used here as examples. In other implementations, the system 100 may be used with other types of buses, networks or protocols.

In an embodiment, the processors 114A, 114B are ARM946 core processors developed by ARM Ltd., but other types of processors may be used. The processors 114A, 114B are not limited to ARM946.

Data Transfer

A data transfer may be a 2-step process. For a "transmit path," one of the PCI DMA engines 102A or 102B transfers data from the PCI-side host memory 140 to the intermediate memory 120 via a PCI bus. One of the Link DMA engines 104A or 104B then transfers the data from the intermediate memory 120 to the Fibre Channel Link/interface 150.

For a "receive path," one of the Link DMA engines 104A, 104B transfers data from the Fibre Channel Link interface 150 to the intermediate memory 120. One of the PCI DMA engines 102A or 102B then transfers the data from the intermediate memory 120 to the PCI side host memory 140.

I/O Completions

When data is successfully stored or retrieved from the intermediate memory 120 by one of the engines 102A, 102B, 104A or 104B, the engine 102A, 102B, 104A or 104B outputs a corresponding "I/O completion" notification (notice) to a corresponding completion RAM interface logic 106A or 106B.

An "I/O completion" is when an input (I) or output (O) operation successfully completes or completes in error. Examples of I/Os include: (1) transferring data from the host memory 140 to the intermediate memory 120 (transmit path), (2) transferring data from the intermediate memory 120 to the host memory 140 (receive path), (3) transferring data from intermediate memory 120 to the Link 150 (transmit path), and (4) transferring data from the Link 150 to the intermediate memory 120 (receive path). One of the processors 114A or 114B needs to know when each operation completes successfully. The processor 114 also needs to know if the operation completed but had an error, so the error recovery methods can be invoked.

FIG. 1 illustrates how one or both processors 114A, 114B may process I/O completions stored in the RAMs 108A, 108B.

In a first configuration, hardware may be configured to provide mode control bits to firmware, where the mode control bits set the system 100 in a single channel mode, a dual channel mode or a supercharge mode.

In a second configuration, hardware and/or firmware may switch the system 100 between single channel mode, dual channel mode and/or a supercharge mode. For example, hardware or firmware may dynamically determine whether one set of DMA engines 102 and 104 (e.g., 102A and 104A) is idle and switch from single channel mode to supercharge mode.

Single Channel Mode

In a non-supercharge, "single channel" mode, the "transmit" and "receive" paths are both operating simultaneously for one "channel" 101 to process the I/O completion notifications. Thus, only one processor 114 is controlling the entire processing of I/O completions. In single channel mode, only one channel 101 is operational, and the "other channel" 101 is non-operational or idle. A "non-operational" channel is defined as a channel 101 with no I/O completions to be processed.

Dual Channel Mode

In a "dual channel" mode, both channels 101A, 101B are performing both transmit and receive operations simultaneously and independently. Both channels A 101A and B 101B are also processing I/O completions simultaneously. Essentially, "dual channel" mode is when single channel operation is occurring on both channels.

In non-supercharge "single channel" and "dual channel" modes, I/O completions are posted to only one completion RAM 108, which is connected to a processor's DTCM port.

Supercharge Mode

When only one channel 101A or 101B is operating in single channel mode, the other channel is in a non-operational state. The processing resources of a non-operational channel are unused.

According to mode control bits (or hardware or firmware detecting a single channel mode), the processors 114A, 114B may activate a "supercharge" mode to increase I/O processing speed and boost performance. In supercharge mode, the active channel 101 uses hardware components from the non-operational channel 101. Specifically, each Rx/Tx DMA engine 102A and 104A (or 102B and 104B if channel B is active) writes/posts PCI and link I/O completion notifications to both completion RAMs 108A and 108B. This feature allows either processor 114A or 114B to access an I/O completion notification, prepare the I/O for a subsequent processing operation (i.e., the next DMA stage), if any, and notify the other processor 114 to prepare the I/O for the subsequent processing operation.

This feature prevents I/O processing bottlenecks. A processor 114 that originated the I/O (i.e., initially set up the DMA operation) does not need to be involved during the post processing of the I/O completion notification when the DMA operation is complete. Instead, the DMA completion is directly passed into the completion RAM 108 for the other processor 114 to begin work without involving firmware.

In "supercharge" mode, both processors 114A, 114B may control the single active channel 101, i.e., both processors 114A, 114B can operate on a single active channel's I/O completions. There is no idle channel in supercharge mode. However, there may be some hardware that is not being used, depending on the configuration selected, as described below.

The supercharge mode is flexible in how the processors 114A, 114B are used to divide the processing work. Writing I/O completion notifications from each Rx/Tx DMA engine 102, 104 to both completion RAMs 108A and 108B allows the firmware in the system 100 to experiment with different configurations to determine an optimal solution.

In a supercharge mode configuration, hardware or firmware may dedicate one processor 114A to process I/O completions from PCI Tx and Rx DMA operations, while the other processor 114B may be dedicated to process I/O completions from Fibre Channel Link Tx and Rx DMA operations (see FIG. 6 described below). The system 100, however, is not limited to one processor 114 handling PCI Tx and Rx DMA operations and the other processor 114 handling Link Tx and Rx DMA operations.

In another supercharge mode configuration, hardware or firmware may be configured to allow one processor 114A to control the entire "transmit path" from the host memory 140 to the Fibre Channel Link/interface 150 (i.e., PCI Tx DMA and Link Tx DMA), and the other processor 114B to control the entire "receive path" from the Fibre Channel Link/interface 150 to the host memory 140 (i.e., Link Rx DMA and PCI Rx DMA).

In another supercharge mode configuration, hardware or firmware dedicates one processor 114 to handle the PCI TX and NL-Port RX, and the other processor 114 to handle the PCI RX and NL-Port TX.

The hardware or firmware may also permit varying degrees of these configurations.

In the supercharge configuration where one processor 114A controls PCI Tx and Rx DMA operations, when the processor 114A is finished with a PCI Tx DMA operation, the processor 114A may send a message to the other processor 114B (which controls Link Tx and Rx DMA operations) via a line 130B to notify the processor 114B that the data is ready for transmission to the Fibre Channel link/interface 150.

The system 100 may use low latency, zero-wait-state RAMs as the RAMs 108A, 108B to store I/O completion notifications so either processor 114A or 114B can quickly prepare the I/O for the next DMA stage. Zero-wait-state RAMs 108A, 108B reduce RAM access time by the processors 114A, 114B. Low latency, zero-wait-state RAMs and other specialized hardware may provide a high performance solution for improving the number of I/O completions per second (IOPS).

In an alternative system, software may manually move the I/O completion messages from one processor to another processor using higher latency memory (memory with wait states). This type of alternative system may result in lower performance.

Communication Between the Processors

Communication between the two processors 114A, 114B may occur in at least two ways. First, lines 130A, 130B may provide a fast and efficient communication exchange mechanism between the two processors 114A and 114B. The lines 130A, 130B improve data processing speed. The lines 130A, 130B may allow each processor 114 to write a single word or a burst of eight words to the other processor's zero-wait state completion RAM 108.

For example, in a supercharge mode, DMA I/O completions from the PCI TX/RX engine 102A and the Link TX/RX engine 104A may be posted to both processors' completion RAMs 108A, 108B. When one processor 114A processes an I/O completion, the processor 114A may send a message to the other processor 114B via a line 130B. Communication messages between the processors 114A, 114B may convey information such as "Processor A has completed DMAing data for a particular I/O, and the I/O is ready for the next processing step." When the system 100 is running in "supercharge mode," an efficient message exchange between the two ARM processors 114A, 114B via lines 130A, 130B may dramatically improve I/O processing speed.

Second, each processor 114 can notify the other processor by using doorbell registers and control logic 602A, 602B, as described below with FIGS. 6 and 7.

Control Logic and RAM

Figure 2:
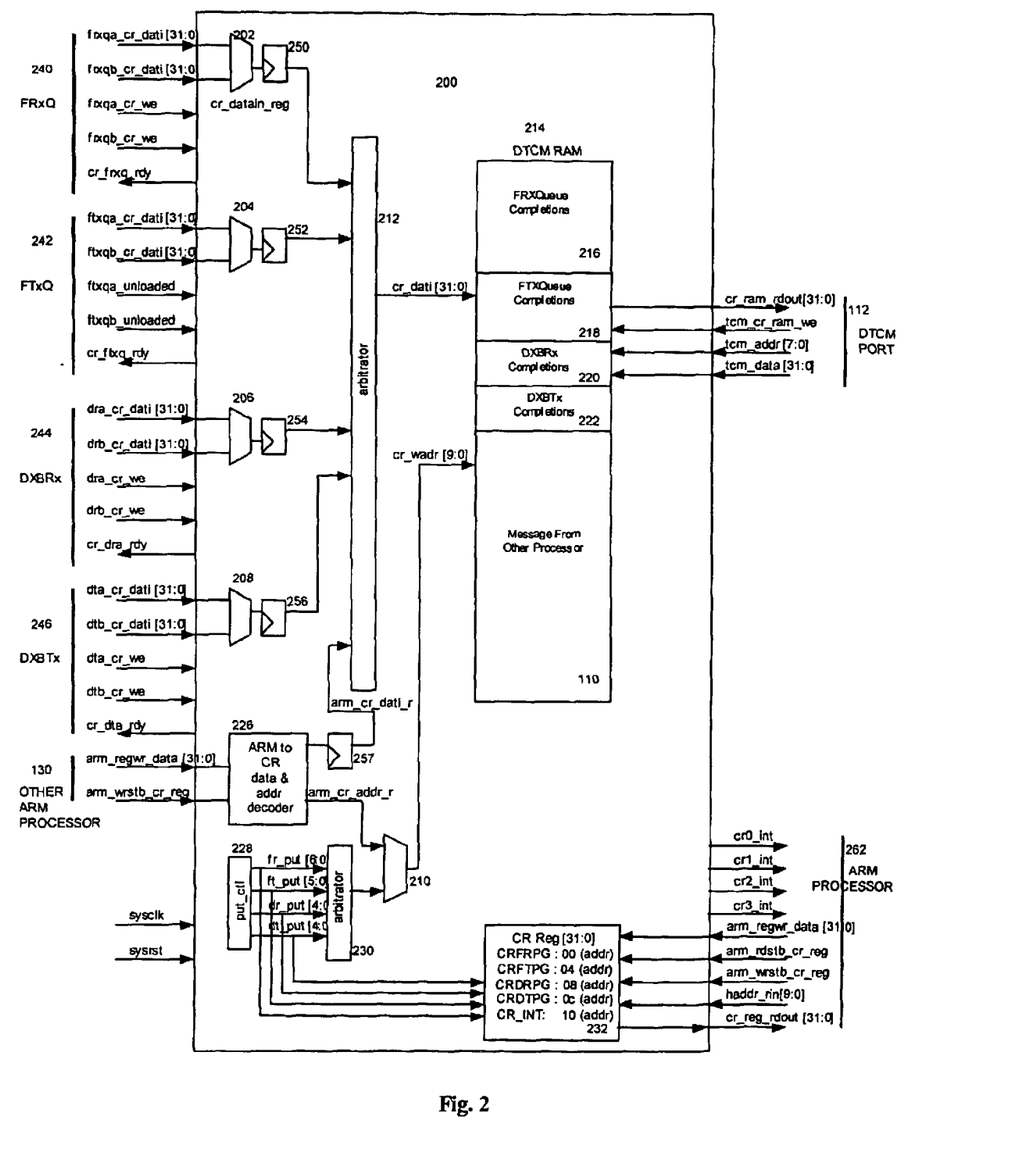
FIG. 2 illustrates an embodiment of completion control logic and a completion RAM that may be implemented in each side of the system of FIG. 1.

FIG. 2 illustrates an embodiment of completion control logic 200 and a DTCM RAM 214 that may be implemented in each side 101A and 101B of the system 100 of FIG. 1. The control logic 200 is coupled to five data paths: a Fibre Channel receive path FRxQ 240, a Fibre Channel transmit path FTxQ 242, a PCI receive path DXBRx 244, a PCI transmit path DXBTx 246 and a write path 130 from the other ARM processor 114. The control logic 200 may also be coupled to a system clock line (sysclk), a system reset line (sysrst), a "data tightly coupled memory" (DTCM) port 112, and an interface 262 to the ARM processor 114. As shown in FIGS. 1 and 2, the interface/signal lines 262 are between RAM interface logic (106 in FIG. 1; 200 in FIG. 2) and an ARM processor 114.

The DTCM RAM 214 in FIG. 2 corresponds to the completion RAM 108A and message area 110A (or the completion RAM 108B and message area 110B) in FIG. 1. In FIG. 2, a data tightly coupled memory (DTCM) port 112 enables the ARM processor 114 to communicate with the DTCM RAM 214. The DTCM RAM 214 interfaces with the dedicated DTCM port 112 inside an ARM processor 114A, 114B. A "DTCM" may be defined as a memory that supports a processor's DTCM port protocol. Because the DTCM port 112 is built in the ARM processor 114, processor-to-memory access time may improve dramatically.

The completion control logic 200 in FIG. 2 includes a plurality of multiplexers 202, 204, 206, 208 and 210, a plurality of registers 250–257, an arbitrator 212, an ARM-to-CR data and address decoder 226 ("CR" stands for Completion RAM), a put_ctl controller 228, another arbitrator 230, and a CR register 232 ("CR" stands for Completion RAM). The control logic 200 may include other elements in addition to or instead of the elements shown in FIG. 2. The controller 228 may keep track of four Put pointers.

Although register symbols 250–257 are shown as single-bit registers, the register symbols 250–257 may represent registers configured to store any desired number of bits. The fifth register 257 may be coupled to the decoder 226 as shown or within the decoder 226.

In an embodiment, the DTCM RAM 214 has 2 read ports and 2 write ports. The DTCM RAM 214 may be a synchronous RAM. In a configuration, the RAM 214 is a 1024×32 RAM, but RAMs with various other word lengths and any number of words may be used.

In an embodiment, the DTCM RAM 214 is divided into a plurality of logical blocks (also called "queues" or "partitions"), such as an FRXQueue completions block 216, an FTXQueue completions block 218, a DXBRx completions block 220, a DXBTx completions block 222. These blocks 216, 218, 220 and 222 may correspond to the RAM 108 in FIG. 1. The message-from-other-processor block 110 is another partition of the DTCM RAM 214. Each block may have any desired number of entries, such as 32, 64, 128, or 768 entries.

Each block is operable to store I/O completions from its respective source. For example, the FRXQueue completion block 216 may store Rx I/O completions from Fibre Channel Link Receive DMA operations. The Rx I/O completion relates to data transferred from the Fibre Channel Link/interface 150 to the intermediate memory 120. As another example, the DXBRx completion block 220 may store I/O completions from PCI Receive DMA operations.

The control logic 200 may be configured to allow each I/O completion to be written to only one RAM block 216, 218, 220, 222 or 110 if the block has sufficient space. The control logic 200 may generate a processor interrupt to a processor 114 whenever an I/O completion is written to the DTCM RAM 214.

If a RAM block is full and new I/O completions arrive, the new I/O completions should not over-write the data in the DTCM RAM 214. Instead, the control logic 200 allows the data source to write the new arriving I/O completions first to a register, such as registers 250–257. Then the control logic 200 writes the data into the DTCM RAM 214.

If a register is already filled with a new I/O completion, the register may not be ready to store new data. An error flag may be asserted by the control logic 200 or firmware, and a source may be instructed to resend the I/O completion again later.

RAM Operation

After a system reset, the completion RAM control logic 200 may generate five READY signals to data sources coupled to the five data paths 240–248. Upon detecting a set READY signal, each data source may generate a write enable signal if the data source has data (I/O completions) to write to the DTCM RAM 214. Five data paths 240–248 may start to send their first data to five different "datain_reg" registers 250–257 once the write enable signal is asserted. When the registers 250–257 are filled, the READY signal may be de-asserted to prevent the data sources from writing more data to the "datain_reg" registers 250–257.

Write enable signals and data signals (I/O completions) from different sources are sometimes transmitted at different speeds (clock domains) compared to the operating speed of the completion RAM control logic 200. For example, data signals (I/O completions) from the DXB receive path 244 (PCI Receive) may be received at 33 MHz, 66 MHz or 133 MHz. Data from the Link FRxQ path 240 (Fibre Channel Link Receive) may be synchronized to a 200 MHz clock. Data from the Link FTXQ 242 (Fibre Channel Link transmit) may be synchronized to a 106 MHz clock. An ARM processor may post I/O completions or an inter-processor message with a 200 MHz clock. If these signals are not synchronized, the system 100 may miss important completion information. The system 100 may be configured to synchronize or re-clock these different signals to a common clock domain before the signals are processed.

When the registers 250–257 are filled, the control logic 200 determines whether to move the data in the "datain_reg" registers 250–257 to specific RAM blocks 216–222, 110. If a specific RAM block 216–222, 110 is not full, the control logic 200 moves the data from a "datain_reg" register to a specific RAM block 216–222, 110. The control logic 200 may also assert a READY signal to a source to indicate that the associated "datain_reg" register is ready to store the next I/O completion message.

If a specific RAM block 216–222, 110 is full, the control logic 200 will not move the data in the "datain_reg" register to the specific RAM block 216–222, 110. The READY signal to the source will remain active low.

If a source tries to continue writing data to the source's associated "datain_reg" register, the previously-loaded data in the register may be overwritten. The control logic 200 may set a flag or send an interrupt signal to the source. The source will know when and which data has been corrupted. The source may re-send the data later. In this case, no data in the DTCM RAM 214 is overwritten.

Five data paths 240–248 may try to access five different blocks 216–222, 110 of the DTCM RAM 214. Five different registers 250–257 are configured to store data from five different sources. When a PCI DMA 102, a LINK DMA 104 and an ARM processor 114 try to write I/O completions via a plurality of data paths 240–248 to the DTCM RAM 214 at the same time, the control logic 200 may overcome the possibility of data corruption.

When all five registers 250–257 are loaded, the arbitrator 212 decides which register data is written to the DTCM RAM 214 first. The arbitrator 212 may use a quick and fair arbitration method, such as a round robin method, to move data to different RAM blocks 216, 218, 220, 222, 110. The arbitration method ensures that data from different sources have fair and quick access to the RAM blocks 216–222, 110.

The control logic 200 may also overcome the possibility of data corruption by ensuring that the RAM write cycle for a particular data source is complete before a second write is attempted by the same data source. An interrupt may be generated by the control logic 100 or firmware to notify the data source and the firmware if an I/O completion notification was overwritten. The data source may resend the completion notification.

In an alternative method, when the RAM blocks 216–222, 110 and/or registers 250–257 are filled, the READY signal ("rdy" in FIG. 2) to the respective DMA will become inactive to prevent the writing of the completion status. The DMA will be placed in a standby mode until the READY signal becomes active again. Then the I/O completion status is written into the completion RAM or registers 250–257.

RAM Pointers

Figure 3:
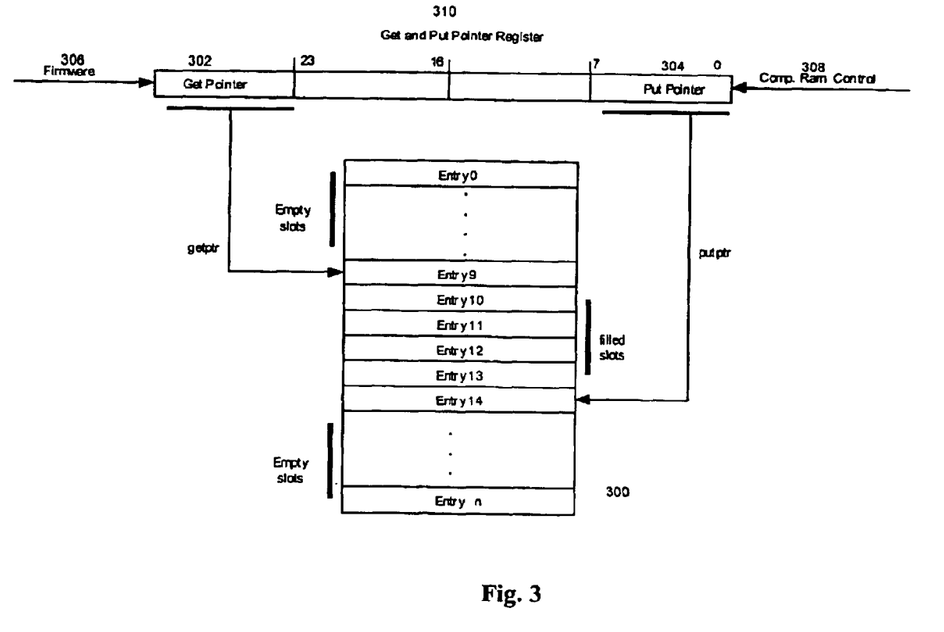
FIG. 3 illustrates an embodiment of a RAM block from the RAM of FIG. 2, Get and Put pointers, firmware, a register and completion RAM control logic.

FIG. 3 illustrates an embodiment of a RAM block 300 from the RAM 214 in FIG. 2, firmware 306, a get pointer field 302, a put pointer field 304 and control logic 308 for the put pointer 304. The firmware 306 may be stored in a memory and executed by a controller or processor in the control logic 200 of FIG. 2. Alternatively, the firmware 306 may be executed by the processor 114 in FIG. 2. The control logic 308 represents the completion RAM control logic 200 in FIG. 2. The registers 310 are configured to store a get/read pointer 302 and a put/write pointer 304. The RAM block 300 in FIG. 3 may represent any one of the RAM blocks 216–222 in FIG. 2. Each of the RAM blocks 216–222 in FIG. 2 may be associated with its own get and put pointers 302, 304.

To determine whether the first four RAM blocks 216, 218, 220 and 222 in FIG. 2 are full, the RAM control logic 200 may manage four put pointers for the first four RAM blocks 216–222. When an I/O completion message is written into a corresponding RAM block 300 (one of the RAM blocks 216, 218, 220 or 222 in FIG. 2), the put_ctl controller 228 increments a put pointer 304 (FIG. 3).

The put_ctl controller 228 passes the put pointer value to the CR Reg registers 232, where a comparison is made between the put pointer 304 and a get pointer 302 that corresponds to the particular RAM block 300. When the put pointer 304 is greater than the get pointer 302, an interrupt is generated to firmware 306 indicating that there is at least one completion message in the completion RAM block 300.

When firmware 306 retrieves the I/O completion message, the firmware 306 increments the corresponding get pointer 302. When firmware 306 retrieves all of the outstanding messages and increments the appropriate get pointer 302, the get pointer 302 will equal the put pointer 304, and the interrupt condition will be removed.

The get pointer 302 and the put pointer 304 of the RAM block 300 may be easily tracked by the firmware 306. In FIG. 3, the control logic 308 increments the put pointer 304 by one after each write operation to the block 300 is completed. When the put pointer 304 reaches the end (last entry ENTRY n) of the RAM block 300, the control logic 308 may cause the put pointer 304 to wrap back to the beginning ("ENTRY 0") of the RAM block 300.

The firmware 306 manages four get pointers, such as the get pointer 302 in FIG. 3, which point to entries within the first four RAM partitions 216–222. The firmware 306 increments the get pointer 302 by 1 after each read operation is completed. When the get pointer reaches the end (last entry, "Entry n") of the RAM block 300, the firmware 306 may wrap the get pointer 302 to the beginning ("Entry 0").

As soon as data (I/O completion) is written to the RAM block 300, an interrupt may be generated by the RAM control logic 308. The firmware 306 may start to read the data out from the RAM block 300 through the DTCM port 112 to the processor 114.

The control logic 308 or firmware 306 may use the values of the put and get pointers 304, 302 to keep track of the status of each RAM block 216–222 and predict how many Completion RAM entries are filled. The firmware 306 or control logic 308 may also use the put and get pointers 302, 304 to predict when the RAM block 300 is full or empty. For example, if the put pointer 304 is equal to the get pointer 302 minus one (Put=Get−1), the block or queue 300 is full. This condition may mean there is one available location in the RAM 214 that cannot be used, and the data in the last entry is stored in a "datain_reg" register 250, 252, 254, 256, 257 (FIG. 2) associated with the block 216, 218, 220, 222, 110. If the last RAM location was written, the put and get pointers 304, 302 would be equal, which indicates that the block 300 is empty when if fact the block 300 is full. For this reason, the last RAM entry is stored in the external register until space is available in the specific RAM block 300.

If the put and get pointers 304, 302 are equal, i.e., put=get, for the block 300, the block or queue 300 is empty. After a chip reset, the put and get pointers 304, 302 may be equal to a default start value.

Storing Messages from Another Processor

The fifth RAM partition/block 110 in FIG. 2 represents one of the message areas 110A, 110B in FIG. 1. The fifth RAM block 110 is configured to store messages from the "other processor." For example, the message area 110A in FIG. 1 is configured to store messages from processor 114B, and the message area 110B is configured to store messages from processor 114A. The Channel B processor 114B in FIG. 1 will use ARM register access on the ARM processor interface 248 in FIG. 2 to write a message to the fifth RAM partition block 110 (message area 110A in FIG. 1) of the Channel A RAM 108A.

The decoder 226 will provide the initial write address to write an I/O completion message in the RAM block 110. Once an I/O completion message is written to the block 110, the decoder 226 will increment the write address for the next write operation. In the next message write cycle, the processor interface 248 does not need to provide the address. The hardware 200 therefore includes information indicating where the new message should be stored.

If the Channel B processor 114B signals a write of a message to a completely new address, the processor 114B should provide both the message and an address. The Channel B "DTCM" port 112B in FIGS. 1 and 2 is used to retrieve Channel B's own message and completion data. Likewise, Channel A "DTCM" port 112A in FIG. 1 is used to retrieve Channel A's own message and completion data.

Since a DTCM can be physically placed very close to the processor, the system 100 can handle zero wait state access.

Figure 4:
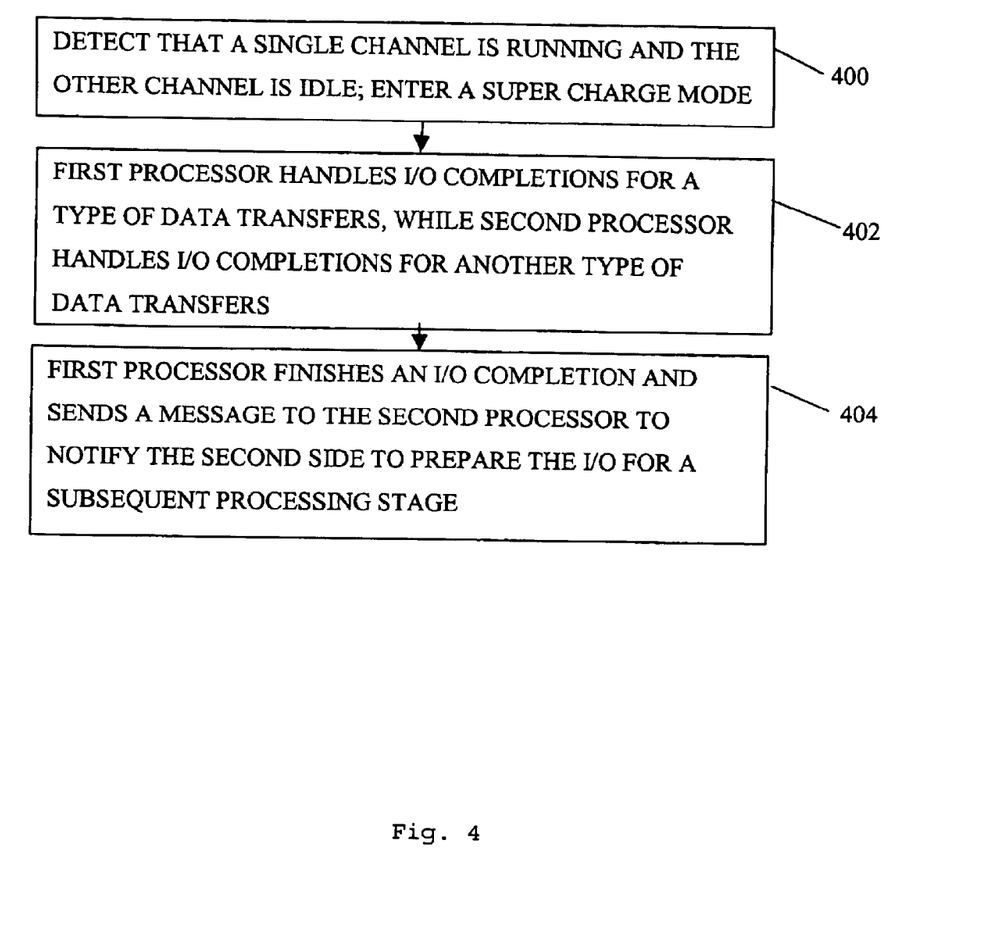
FIG. 4 illustrates an embodiment of a process of using the system of FIG. 1.

FIG. 4 illustrates an embodiment of a process of using the system 100 of FIG. 1. In a block 400, the system 100 detects that a single channel 101A or 101B is running, and the other channel is idle or non-operational. The system 100 enters a "supercharge mode." In a block 402, a first processor (assume 114A) can handle one type of I/O completions, such as I/O completions from data transfers between the host memory 140 and the intermediate memory 120. A second processor (assume 114B) can handle another type of I/O completions, such as I/O completions from data transfers between the intermediate memory 120 and the Fibre Channel Link/interface 150.

In a block 404, the first processor 114A finishes an I/O completion and sends a message to the second processor 114B to notify the second processor 114B to prepare the I/O for the next processing stage.

Figure 5:
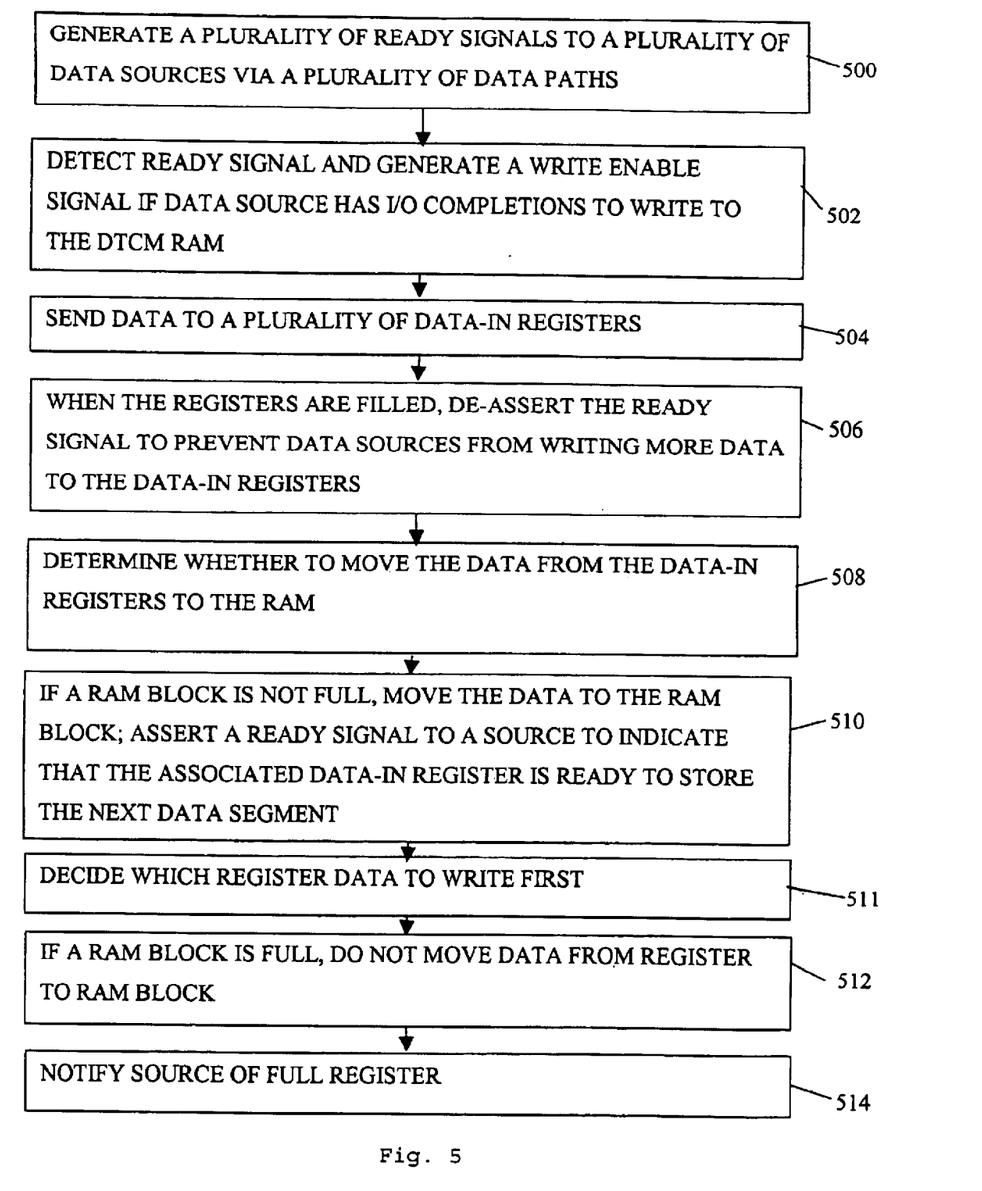
FIG. 5 illustrates an embodiment of a process of using the control logic and RAM of FIGS. 2 and 3.

FIG. 5 illustrates an embodiment of a process of using the control logic 200 and RAM 214 of FIGS. 2 and 3. In a block 500, the completion RAM control logic 200 generates a plurality of READY signals to a plurality of data sources via a plurality of data paths (e.g., 240–248).

In a block 502, each data source detects the set READY signal and generates a write enable signal if the data source has data (I/O completions) to write to the DTCM RAM 214.

In a block 504, once the write enable signal is asserted, a plurality of data paths start to send data to a plurality of data-in registers (e.g., 250–256).

In a block 506, when the registers are filled, the READY signal is de-asserted to prevent the data sources from writing more data to the data-in registers.

In a block 508, when the registers are filled, the control logic 200 determines whether to move the data from the data-in registers to the DTCM RAM 214, which depends on whether each RAM block 216–222 is full.

In a block 510, if a RAM block is not full, the control logic 200 moves the data to the RAM block. The control logic 200 may also assert a READY signal to a source to indicate that the associated data-in register is ready to store the next data segment.

In a block 511, when all or some of the five registers 250–256 are loaded, the arbitrator 212 decides which register data is written to the DTCM RAM 214 first. The arbitrator 212 may use a round robin method for fair and quick access to the RAM 214.

In a block 512, if a RAM block 216–222 is full, the control logic 200 does not move the data in the data-in register to the RAM block 216–222. The READY signal to the source remains active low.

In a block 514, a source may try to continue writing data to the source's associated data-in register. The control logic 200 sets a flag or sends an interrupt signal to source if the register already stores data.

Door Bell Registers and Control Logic

FIG. 6 illustrates an embodiment of a system 600 with two processors 114A, 114B operating in a supercharge channel mode, e.g., two processors 114A, 114B working together to control a single Fibre Channel Link. The system 600 includes a PCI/X interface 606, two completion RAMs 108A, 108B, a Link Rx/Tx DMA engine 104, a PCI Rx/Tx DMA engine 102, two processors 114A, 114B, door bell registers and control logic 602A, 602B between the processors 114A, 114B, an NL-Port and serdes module 608, a QDR RAM controller 604 and a QDR external memory 605.

Figure 7:
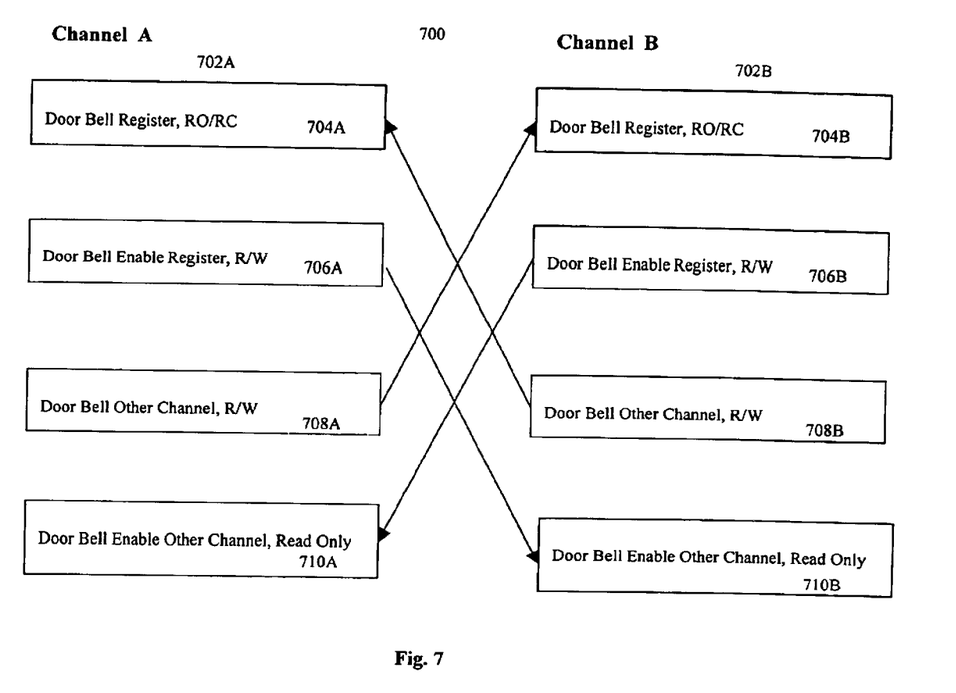
FIG. 7 is a block diagram of an embodiment of inter-processor door bell registers.

FIG. 7 is a block diagram of an embodiment of interprocessor door bell registers and logic in FIG. 6. FIG. 7 illustrates the interaction and mapping of a set 702A of door bell registers 704A, 706A, 708A, 710A for Channel A and a set 702B of door bell registers 704B, 706B, 708B, 710B for Channel B. The registers include Door Bell Registers RO/RC 704A, 704B, Door Bell Enable Registers R/W 706A, 706B, Door Bell Other Channel R/W registers 708A, 708B and Door Bell Enable Other Channel, Read Only registers 710A, 710B.

FIGS. 6 and 7 may illustrate the overall operation of DTCM and door bell registers 602A, 602B. The processors 114A, 114B in Channels A and B can communicate through the door bell registers and control logic 602A, 602B. Each processor 114 may use the door bell registers and control logic 602A, 602B to notify the other processor 114 about important events.

For example, processor A 114A can "ring" processor B 114B by writing a bit to the Channel A Door Bell Other Channel register 708A. The Channel A Door Bell Other Channel register 708A is mapped into Processor B address decode space as the Channel B Door Bell Register 704B, as shown by the arrow between the two registers 708A, 704B. Thus, setting a bit in the Channel A Door Bell Other Channel register 708A causes a bit to be set in the Channel B Door Bell Register 704B.

Processor B 114B can allow an interrupt to be generated for a particular door bell bit in the door bell register 704B by setting an appropriate enable bit in the Channel B Door Bell Enable Register 706B. Processor B 114B reads and clears the bit set in the Door Bell register 704B.

Processor A 114A has a read-only capability for Processor B's Door Bell Enable Register 706B, as shown by an arrow from the register 706B to the Channel A Door Bell Enable Other Channel register 710A.

There is also a corresponding set of registers 704A, 706A, 708B, 710B that allow Processor B 114B to ring Processor A 114A. Thus, processor A 114A may also be able to generate an interrupt when a particular door bell bit is set by processor B 114B.

A number of embodiments have been described. Nevertheless, it will be understood that various modifications may be made without departing from the spirit and scope of the application. Accordingly, other embodiments are within the scope of the following claims.

What is claimed is:

1. A system comprising:
   a first channel comprising a first direct memory access (DMA) engine, a second DMA engine, a first random access memory (RAM) and a first processor; and
   a second channel comprising a third DMA engine, a fourth DMA engine, a second RAM and a second processor;
   wherein the first RAM is configured to store input/output (I/O) completions from the first and second DMA engines, the first processor is configured to process I/O completions stored in the first RAM, the second RAM is configured to store I/O completions from the third and fourth DMA engines, and the second processor is configured to process I/O completions stored in the second RAM.

2. The system of claim 1, wherein the first and third DMA engines are each configured to transfer data between a host memory and an intermediate memory, after each transfer, the first and third DMA engines generate an I/O completion.

3. The system of claim 2, further comprising a peripheral component interface bus configured to transfer data to and from the host memory.

4. The system of claim 1, wherein the second and fourth DMA engines are each configured to transfer data between an intermediate memory and a Fibre Channel interface, after each transfer, the second and fourth DMA engines generate an I/O completion.

5. The system of claim 1, wherein the first and second RAMs are zero-wait-state RAMs.

6. The system of claim 1, wherein the first and second RAMs have wait-states.

7. The system of claim 1, being configurable to activate the first and second DMA engines or the third and fourth DMA engines; if the first and second DMA engines are inactive, the first RAM is configured to store I/O completions from the third and fourth DMA engines; if the third and fourth DMA engines are inactive, the second RAM is configured to store I/O completions from the first and second DMA engines.

8. The system of claim 1, being configured to detect whether the first and second DMA engines or the third and fourth DMA engines are inactive; if the first and second DMA engines are inactive, the first RAM is configured to store I/O completions from the third and fourth DMA engines; if the third and fourth DMA engines are inactive, the second RAM is configured to store I/O completions from the first and second DMA engines.

9. The system of claim 1, wherein the second processor is configured to send a message to the first processor after the second processor processes an I/O completion from the first DMA engine that was stored in the second RAM.

10. The system of claim 9, wherein the message causes the first processor to further process data related to the I/O completion.

11. The system of claim 9, wherein the first RAM is configured to store the message.

12. The system of claim 1, wherein the first processor is configured to process I/O completions related to data transferred between a host memory to an intermediate memory; and the second processor is configured to process I/O completions related to data transferred between the intermediate memory and a Fibre Channel interface.

13. The system of claim 1, wherein the first processor is configured to process I/O completions related to data transferred from a host memory to an intermediate memory and data transferred from the intermediate memory to a Fibre Channel interface; and the second processor is configured to process I/O completions related to data transferred from the Fibre Channel interface to the intermediate memory and data transferred from the intermediate memory to the host memory.

14. The system of claim 1, wherein the first processor is configured to process I/O completions related to data transferred from a host memory to an intermediate memory and data transferred from a Fibre Channel interface to the intermediate memory; and the second processor is configured to process I/O completions related to data transferred from the intermediate memory to the Fibre Channel interface and data transferred from the intermediate memory to the host memory.

15. The system of claim 1, wherein hardware is configured to control a type of I/O completions processed by the first and second processors.

16. The system of claim 1, wherein firmware is configured to control a type of I/O completions processed by the first and second processors.

17. The system of claim 1, wherein the first and second RAMs each comprise a plurality of logical blocks, each logical block being configured to store I/O completions related to a pre-determined type of data transfers.

18. The system of claim 17, wherein each channel further comprises control logic configured to generate a notification to the processor when data is stored in the RAM.

19. The system of claim 1, wherein the first and second RAMs each comprise a plurality of logical blocks, each logical block being configured to store I/O completions from one of the DMA engines.

20. The system of claim 19, further comprising a put pointer and a get pointer for each logical block, the put pointer comprising an address of a location within the logical block for storing a new I/O completion, the get pointer comprising an address of a location within the logical block for retrieving a stored I/O completion.

21. The system of claim 1, wherein the first RAM comprises a logical block configured to store messages from the second processor, and the second RAM comprises a logical block configured to store messages from the first processor.

22. The system of claim 1, wherein each processor comprises a data tightly coupled memory (DTCM) and a DTCM port.

23. The system of claim 1, wherein each channel further comprises control logic coupled to the RAM and configured to control access to the RAM.

24. The system of claim 23, wherein each channel further comprises RAM control logic that is configured to synchronize signals from various clock domains, the signals being received by the RAM.

25. The system of claim 1, wherein each channel further comprises firmware configured to control pointers that point to addresses of locations within the RAM.

26. The system of claim 1, wherein each channel further comprises a plurality of registers between the DMA engines and the RAM, each register being configured to store an I/O completion from a pre-determined DMA engine before the I/O completion is transferred to the RAM.

27. The system of claim 26, wherein each channel further comprises an arbitrator configured to arbitrate between a plurality of registers with I/O completions to transfer to the RAM.

28. The system of claim 26, wherein each channel further comprises control logic configured to generate a signal to a DMA engine when a register is full.

29. The system of claim 1, further comprising a plurality of registers coupled between the first and second processors, the registers configured to allow the first processor to notify the second processor that the first processor has a message to send to the second processor.

30. The system of claim 29, wherein the first processor is configured to write a bit in a door-bell-other-channel register, the door-bell-other-channel register being mapped to a door bell register coupled to the second processor, the bit notifying the second processor of a message from the first processor.

31. The system of claim 30, wherein the second processor is configured to write a bit in a door-bell-enable register to allow a bit written in the door-bell-other-channel register by the first processor to interrupt the second processor.

32. The system of claim 31, wherein the first processor is configured to read the door-bell-enable register of the second processor.

33. A system comprising:
    a first channel comprising a first direct memory access (DMA) engine, a second DMA engine, a first random access memory (RAM) and a first processor; and
    a second channel comprising a third DMA engine, a fourth DMA engine, a second RAM and a second processor;
    wherein the first RAM is configured to store input/output (I/O) completions from the first DMA engine, the first processor being configured to process I/O completions stored in the first RAM; and
    wherein the second RAM is configured to store I/O completions from at least the first DMA engine, the second processor being configured to process I/O completions from the first DMA engine that are stored in the second RAM.

34. The system of claim 33, wherein the second RAM stores PCI Rx and PCI Tx I/O completions from the first DMA engine.

35. The system of claim 33, wherein the second RAM stores Link Rx and Link Tx I/O completions from the first DMA engine.

36. A system comprising:
    a first channel comprising a first direct memory access (DMA) engine, a second DMA engine, a first random access memory (RAM) and a first processor; and
    a second channel comprising a third DMA engine, a fourth DMA engine, a second RAM and a second processor;
    wherein the first RAM is configured to store input/output (I/O) completions from the first and second DMA engines, the first processor being configured to process I/O completions stored in the first RAM; and
    wherein the second RAM is configured to store I/O completions from the first and second DMA engines, the second processor being configured to process I/O completions from the first and second DMA engines that are stored in the second RAM.

37. The system of claim 36, wherein the second RAM stores PCI Tx I/O completions from the first DMA engine and Link Tx I/O completions from the second DMA engine.

38. The system of claim 36, wherein the second RAM stores Link Rx I/O completions from the second DMA engine and PCI Rx I/O completions from the first DMA engine.

39. The system of claim 36, wherein the second RAM stores PCI Tx I/O completions from the first DMA engine and Link Rx I/O completions from the second DMA engine.

40. The system of claim 36, wherein the second RAM stores PCI Rx I/O completions from the first DMA engine and Link Tx I/O completions from the second DMA engine.

* * * * *